March 6, 1951 F. C. P. HENROTEAU 2,543,778
APPARATUS FOR MAKING OPTICAL DEVICES
Filed Oct. 14, 1944 2 Sheets-Sheet 1

INVENTOR
FRANCOIS C. P. HENROTEAU
BY
ATTORNEY

March 6, 1951  F. C. P. HENROTEAU  2,543,778
APPARATUS FOR MAKING OPTICAL DEVICES
Filed Oct. 14, 1944  2 Sheets-Sheet 2
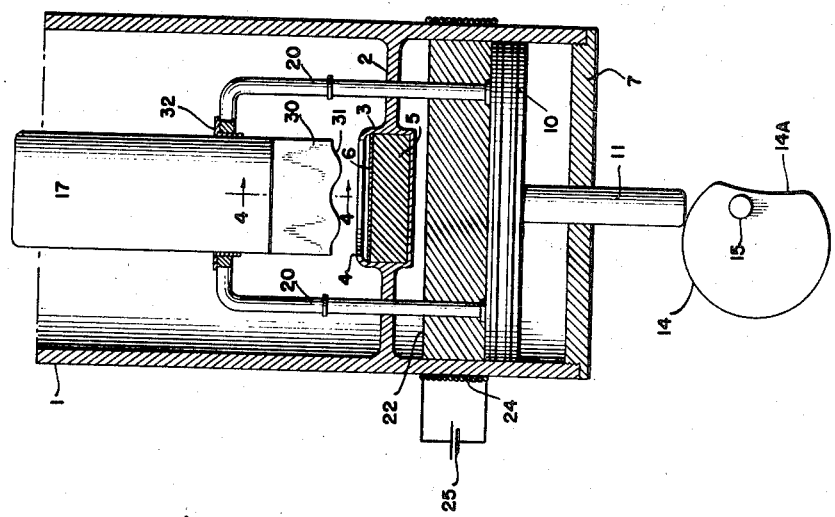
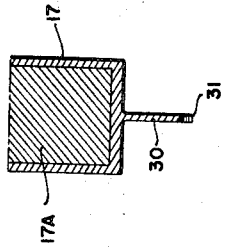
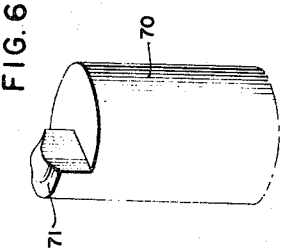
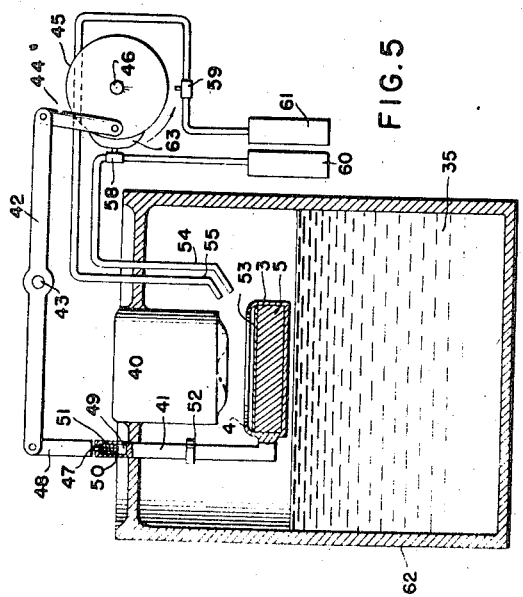
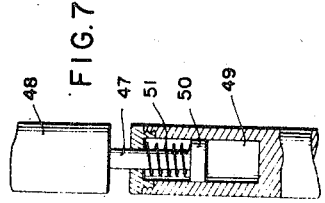
INVENTOR
FRANCOIS C. P. HENROTEAU
BY
ATTORNEY Patented Mar. 6, 1951

2,543,778

UNITED STATES PATENT OFFICE 2,543,778

APPARATUS FOR MAKING OPTICAL DEVICES

François Charles Pierre Henroteau, Fort Wayne, Ind., assignor, by mesne assignments, to Farnsworth Research Corporation, a corporation of Indiana Application October 14, 1944, Serial No. 558,715

7 Claims. (Cl. 41—9)

This invention relates to a method and apparatus for manufacturing lenses and more particularly to a method and apparatus for forming lenses of materials which are soluble in water or other substances.

The use of glass and plastic materials for lenses is well known in the optical art, particularly in devices such as cameras or telescopes, where it is only required that a lens have a simple curvature. High quality glass and plastic lenses are extremely expensive to manufacture even though they have a simple curvature or, in other words, a surface of revolution. They require extremely lengthy, tedious and meticulous grinding operations whereby highly skilled workmen are required for manufacturing such lenses. Consequently, since the lens is the most expensive part of a high quality camera or telescope, the cost of such equipment is determined primarily by the cost of its lens or lens system.

Glass lenses are not only expensive to manufacture but they are also found to be defective in several respects whereby it is substantially impossible to form optical images which are truly or scientifically representative of an original optical image. For example, glass lenses may be either cast or ground to the desired configuration. However, cast lenses are found to include minute bubbles of air which, of course, cause distortion of the optical image. Furthermore, there is great difficulty in casting a glass lens in such fashion that it will cool into the desired curvature. The forms used for casting may be accurate so that in its heated condition the lens may have the desired curvature but shrinkage in different parts of the lens causes such deformation of the curvature that, scientifically speaking, the final product has an entirely different configuration from that originally intended.

The conventional methods of manufacturing glass lenses fail to provide rapid and economical processes of producing lenses of scientifically accurate curvature. The conventional grinding process consists of machine grinding almost to the final curvature of the lens and final grinding and polishing are usually done manually in an attempt to obtain the required accuracy of curvature. The difficulty of manually grinding a lens to within .0001 inch of the desired curvature is obvious to those skilled in the art. Thus, ground lenses are not only undesirable from the standpoint of accuracy but are also not adapted to mass-production methods. Furthermore, only surfaces of revolution can be ground by machine whereby it is impossible to grind by machine lenses of complex curvature.

It has also been proposed to utilize what is commonly known as plastic materials to form optical lenses. Lenses of this material are also manufactured by the casting method and are subject to the same disadvantages as cast-glass lenses. Another method of forming plastic lenses is to provide a mold on which a plain piece of plastic may be heated and permitted to sag into the mold to assume the desired curvature. This process is feasible where it is desired to produce cheap and comparatively simple lenses, but where it is desired to form a lens having a complex curvature accurate to within .0001 inch, it is not feasible to utilize plastic materials. Plastic lenses have the further disadvantage that ambient temperature and humidity conditions may cause them to become deformed and therefore unusable. Plastic materials are also characterized by their tendency to mold or, in other words, to become opaque because of the formation of an opaque layer on their surfaces.

A requirement in connection with certain optical systems is that a lens have a predetermined index of refraction. It is substantially impossible to produce glass or plastic lenses, the refractive indices of which are equal to a predetermined, exact calculated value. For example, it may be calculated that a corrector lens should have a refractive index of 1.48 but the conventional manufacturing methods may change the refractive index to 1.5. Such severe distortion of the optical image occurs as the result of such a change that the lens is useless in many optical systems.

It is known in the prior art to utilize salt crystals and other types of crystals as optical lenses and they are particularly advantageous in that their refractive index is always a fixed quantity. This is by reason of the fact that once a salt crystal is formed its refractive index cannot change. Furthermore, crystals have other very desirable optical characteristics which make them highly efficient optical materials. For example, the structure of crystals is perfectly homogenous, without flaws or striae, and light dispersion in the visible region is very low. Also, crystals are transparent to light waves within substantially the entire visible spectrum from infrared wavelengths of 10 microns to ultra-violet wavelengths of 0.1 micron.

In forming lenses of salt crystals, however, it is very difficult to use a mechanical grinding process as great care is required to prevent chipping or fracture of the crystal. This is due to the fact that by its very nature a salt crystal is extremely brittle and thus subject to breakage or chipping when subjected to even a slight mechanical shock.

Accordingly, it is the principal object of this invention to provide a novel method and apparatus for forming optical lenses of crystals.

Another object of this invention is to provide a method of forming lenses of soluble crystals by a controlled process of dissolution.

Still another object of this invention is to provide apparatus for dissolving soluble crystals to obtain a predetermined form of lens by means of a controlled dissolution process.

In accordance with the broad concept of this invention there is provided a method and apparatus for controlling the dissolution of a soluble lens material to obtain a lens having a predetermined curvature. There is provided a mold and a device disposed adjacent the mold for supporting a lens blank. A means including a source of solvent is operatively associated with the mold and the supporting device for successively removing thin layers of the lens blank, whereby to controllably dissolve the lens blank until its curvature corresponds to that of the mold.

In accordance with a more specific concept of this invention, there is provided apparatus for manufacturing lenses from salt crystals consisting of a container for supporting a crystal which constitutes a lens blank. In the preferred modification of this invention there is provided within the container a substance such, for example, as Wood's metal for forming a temporary film over the upper surface of the crystal lens blank. Wood's metal is an alloy of bismuth, lead, tin and cadmium, the melting point of which is 65.5° C. In accordance with this invention, there is provided an apparatus for heating and cooling the Wood's metal film above and below its melting temperature. For forming the lens blank into a lens of the desired configuration, there is provided within the container, in movable relation thereto, a mold, the configuration of which is the negative of that of which it is desired to form on the crystal. By moving the mold into engagement with the Wood's metal when it is in molten state and into engagement with the crystal, it is possible to remove the Wood's metal film from those portions of the crystal which are contacted by the mold. By cooling the Wood's metal at this time, it is possible to expose those portions of the crystal which were contacted by the mold, and form a protective film over all other portions of the crystal. While the Wood's metal is in a solidified state, water may be introduced into the container and into contact with those portions of the crystal which remain exposed. The water dissolves a minute layer of the crystal whereby the exposed portions thereof may be made to conform with the shape of the mold. By repeating in succession the cycle of operation consisting of heating the Wood's metal, moving the mold into contact therewith and with the lens blank, chilling the Wood's metal, removing the mold and introducing water, the crystal is caused to assume the configuration of the mold. This configuration is necessarily extremely accurate by reason of the fact that only very minute quantities of the crystal are removed during a single cycle.

For forming molds with which to form lenses as described hereinbefore, there is provided in accordance with this invention a master mold which may be in the form of a thin metallic plate, the lower edge of which is cut to the meridian curve of the desired lens. By utilizing a master mold of this type in the process described hereinbefore, the lens mold may be formed along each meridian of that mold. This is accomplished by rotating the master mold after each cycle of operation of the process.

This invention is not limited to the specific protective material described hereinbefore. Instead of Wood's metal it is within the concept of this invention to utilize materials such, for example, as an amalgam. Amalgam may be utilized by forming a thin film of mercury over the lens blank. The mold is then moved into contact with the lens blank, at which time material such as silver may be added to the mercury to form an amalgam which is a solid and capable of retaining the form of the mold. Because of this characteristic, when the mold is removed the portion of the lens blank engaged by the mold is left exposed. Thereafter the crystal may be immersed in water for partial dissolution in accordance with the basic process. When the dissolution step is completed, the amalgam may be liquified by adding more mercury thereto. When using amalgam, it is not necessary to chill or heat the protective film.

A further modification of this invention comprises the use of a film-forming material such as wax. There is provided a container for supporting a lens-forming mold in the upper portion thereof. The lower portion of the container is filled with water. Between the water and the mold there is disposed a container for supporting a lens blank, which container is movably supported for successively lowering the lens blank beneath the surface of the water and elevating the lens blank into engagement with the mold. On the surface of the lens blank there is provided a layer of wax which may be contacted by the mold and removed from those portions of the lens blank which are contacted by the mold. The layer of wax is heated by a source of heat when the lens blank is in a position intermediate the surface of the water and the mold whereby the wax flows evenly over the surface of the lens blank. When the lens blank is in a position to contact the mold, there is provided a source of cooling medium for cooling the wax in such fashion that it will retain the form imparted to it by the mold. Therefore, after the mold has contacted the layer of wax and the lens blank, there are certain portions of the lens blank which are exposed so that when the lens blank is lowered into the water for an interval of time the exposed portions are subjected to dissolution by the water. By repeatedly moving the lens blank into engagement with the mold and into the water, those portions of the lens blank which do not conform to the curvature of the mold are dissolved until eventually the lens blank assumes the configuration of the mold.

Another feature of this invention provides a process for manufacturing very large lenses such, for example, as those utilized in astronomical telescopes. Whereas, in the preferred embodiment of this invention it is intended that the mold shall be adapted to form a complete lens, there is provided in accordance with this modification a mold which is cut to form, for example, a 90° sector of a complete lens. By using the mold in the form of a sector, it is contemplated that one sector of a full-size lens blank may be formed at a time. It is further contemplated that a partial lens in the form of a sector of a complete lens may be formed during a forming operation. When the latter method is used, it is intended that the different sectors may be assembled and joined together to form a complete lens after all of the sectors have been formed in accordance with this invention. It is also contemplated that a sector may be divided in several parts along the radius and each part formed separately.

For a better understanding of the invention, together with other and further objects thereof, reference is had to the following description taken in connection with the accompanying drawings, and its scope will be pointed out in the appended claims.

In the accompanying drawings:

Fig. 3 is an elevation taken partly in section of a modification of the apparatus illustrated in Fig. 1;

Fig. 4 is a cross-section of the apparatus illustrated in Fig. 3, taken on line 4—4 thereof;

Fig. 5 is an elevation view taken partly in section of a further modification of this invention.

Fig. 6 is a perspective view illustrating a modification of the mold shown in Fig. 1;

Fig. 7 is an enlarged detail of Fig. 5.

Figure 1:
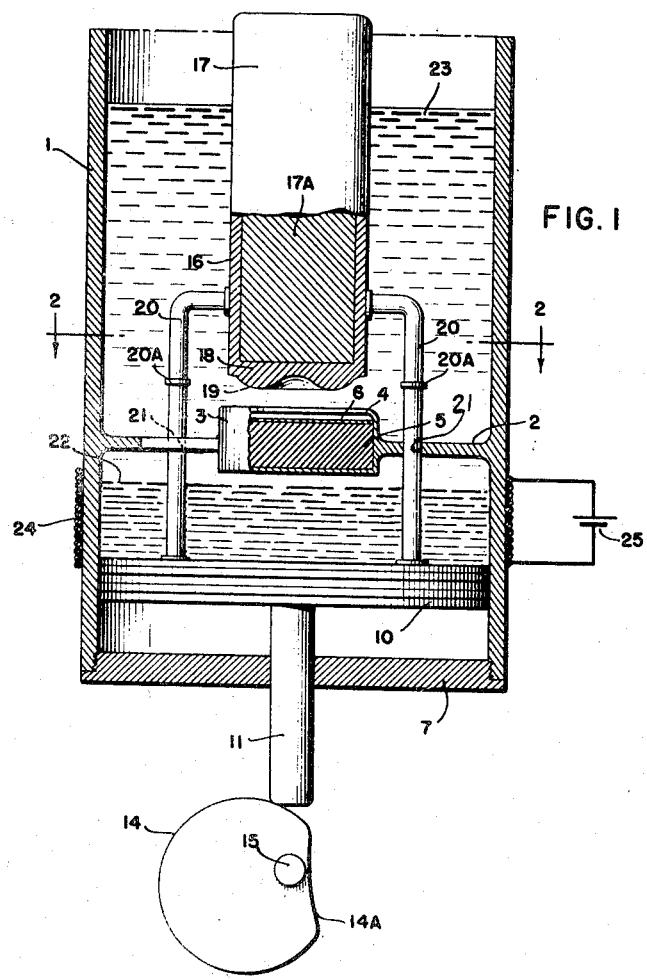
Fig. 1 illustrates apparatus for carrying out the invention and is an elevation taken partly in section.
Figure 2:
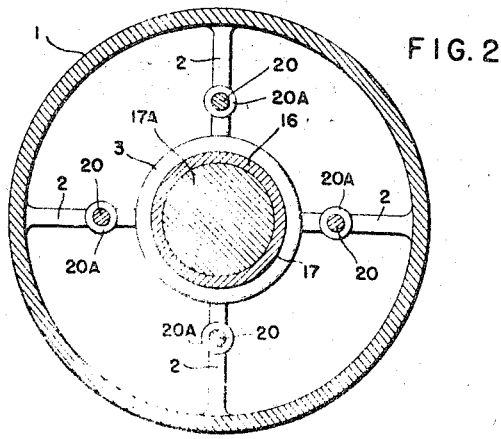
Fig. 2 is a cross-section of the apparatus illustrated in Fig. 1, taken on line 2—2 of Fig. 1.

Referring to Fig. 1 of the drawings, there is illustrated therein apparatus for forming lenses of soluble materials such, for example, as sodium chloride, aluminum-alum or other soluble crystals. Any soluble crystal material may be formed into lenses, providing such a material has the required optical characteristics. There is provided a container 1, including a spider structure 2 and a lens blank holder 3 for supporting the lens blank 5. The lens blank holder is provided with lip 4, the purpose of which will appear in the subsequent description. The lens blank may be in the form of a cylindrical solid or it may initially be formed by dissolving with a brush and a solvent or similar means sufficient material to provide a surface or surfaces having approximately the desired curvature of the final lens. The lower portion of container 1 is closed by a plate 7 threaded or otherwise secured to the side walls. Above plate 7 there is provided a movable piston 10 which engages with a sliding fit the side walls of container 1. Piston 10 is provided with a drive pin 11 which projects through plate 7 into engagement with cam 14. Cam 14 is mounted on a rotatable shaft 15 which may be connected to any suitable driving means such as an electric motor (not shown). Cam 14 is cut away at 14A sufficiently to leave the lower end of pin 11 free when piston 10 is at the lower extremity of its path of movement for a purpose which will subsequently be explained.

For forming a lens from blank 5 there is provided a tubular plunger 17, the side walls of which are hollow and filled with any well-known heat insulating material 16. Alternatively, the walls may be arranged to provide an evacuated space for heat insulation purposes. The bottom 18 of the plunger 17 is a mold having a curved surface 19, the curvature of which corresponds to the negative of the curvature to be imparted to lens blank 5. The plunger 17 may be filled with a liquid 17A such as acetone or alcohol which is intended to act as a refrigerant. The refrigerant 17A may be cooled either by means of a cooling coil (not shown) or by means of "Dry Ice" (solidified carbon dioxide) which may be periodically added to the liquid. Plunger 17 is connected to piston 10 by means of struts 20 which may extend through bearings 21 on spider 2 and be fixed to plunger 17 and piston 10 in any known manner such, for example, as by welding. Thus, it is arranged that piston 10 and plunger 17 may move in unison. For limiting the downward movement of piston 10 and plunger 17, there are provided collars 20A on struts 20.

The space immediately above piston 10 is filled with a substance 22 such, for example, as Wood's metal. Wood's metal is an alloy consisting of bismuth, lead, tin and cadmium, and has a melting point of 65.5° C. It will be made apparent later on in the description what the purpose of this alloy is intended to be. The container 1 is filled with water 23 above the Wood's metal to the level approximately indicated in the drawing. For supplying heat to the materials enclosed within container 1, there is provided an induction coil 24 surrounding the outer surface of container 1 immediately adjacent the space occupied by Wood's metal within the container. Coil 24 may be energized by any suitable source of energy such as a battery 25 or a source of high frequency oscillatory currents, thereby to provide a sufficient quantity of heat to maintain the Wood's metal in a molten condition.

The initial step in the process of forming lenses by dissolution in accordance with this invention consists of moving piston 10 and therewith Wood's metal 22 upwardly by means of cam 14 and rotating shaft 15 to the point where the Wood's metal 22 flows into the container 3, displacing the water from the surface of blank 5 and covering it with a thin protective film 6. The Wood's metal is maintained in a molten condition by coil 24 so that whenever the piston 10 is elevated the Wood's metal will flow into the container 3. The piston then recedes, lowering the Wood's metal away from the container, but lip 4 retains a small quantity of Wood's metal to provide a film 6 over the lens blank which may be of the order of one-sixteenth of an inch in thickness.

As the piston approaches the lower extremity of its movement, the surface 19 of mold 18 moves into the protective film 6 of Wood's metal on lens blank 5. If the upper surface of the lens blank is substantially flat, the mold will only contact comparatively small portions of the lens blank surface, but if the lens blank 5 is initially formed to have the approximate curvature of the final lens, the surface 19 of mold 18 will contact comparatively large portions of the lens blank surface. In any event, the mold removes the film from those portions of the lens blank which are contacted. While the mold is in contact with the lens blank, the protective film 6 of Wood's metal becomes solidified by reason of the fact that the refrigerant 17A in plunger 17 is at a lower temperature than the melting point of the Wood's metal. Thus, the protective film retains the form imparted to it by the surface 19. When the film solidifies, it covers all portions of the lens blank which were not contacted by the surface 19, but those portions which were contacted by surface 19 are exposed. Cooling of the film is aided by reason of the fact that cam 14 is flattened or hollowed out at 14A so that pin 11 is always free when the mold is at the lower extremity of its movement. This allows mold surface 19 to rest on the surface of the lens blank for a period long enough to insure that the protective film may cool sufficiently to become hardened. Also, this feature of cam 14 insures that the surface 19 will always contact the surface of lens blank 5 regardless of the amount of material which is removed from the lens blank by dissolution.

After piston 10 reaches the lower extremity of its movement, it is then reversed and elevated. When the mold 18 rises, lip 4 retains the film 6 on the lens blank thereby to overcome any tendency of the film to adhere to the mold. During the period of elevation, the water 23 is permitted to flow under plunger 17 and into contact with those portions of lens blank 5 which were contacted by mold 18 and left exposed.

Thus, for a certain controllable time interval the exposed portions of lens blank 5 are subjected to a dissolution process which removes a minute quantity of the blank. The dissolution action continues until Wood's metal 22 again flows into the upper portion of container 3 and displaces the water therein. Since the temperature of the Wood's metal 22 is at or above the melting point thereof, the metal in container 3 which was solidified in a previous cycle of operation is again reduced to a molten state. Consequently, the Wood's metal spreads over the entire surface of the blank in preparation for a subsequent contact of the mold. When the piston again moves downwardly, the surface 19 of mold 18 again comes in contact with the Wood's metal film and the lens blank 5 and the whole process is repeated.

The process described hereinbefore is continued through successive cycles of operation until lens blank 5 is dissolved to such an extent that stops 20A engage spider 2. Stops 20A are provided on the struts 20 in order to limit the degree of downward movement of the mold. The position of the stops is so adjusted for a given lens blank that the lens surface will be completely formed when they engage the spider member 2, whereby the dissolution process may be automatically terminated.

As stated hereinbefore, extreme accuracy is obtainable by the dissolution process. The amount of material which may be dissolved during each successive cycle of operation is determined by the temperature of the solvent and the degree of its saturation. For example, the temperature of the water may be controlled by a suitable automatically controlled heating means to provide a certain speed of dissolution. Also the water may be initially saturated to a predetermined degree with the material of which the lens is made in order to provide a predetermined speed of dissolution. The speed of dissolution may be further controlled by adjusting the speed of cam 14 whereby the exposed portions of the lens blank may be acted on by the solvent for a given period during each upward movement of the mold. It is possible to adjust the foregoing factors to obtain a lens surface the curvature of which is accurate within one one-hundred-thousandth of an inch.

It is to be noted that the particular arrangement of container 3 makes it possible to provide only a thin film of Wood's metal over the upper surface of lens blank 5. The upper extremities 4 of the wall of container 3 are intended to extend only very slightly, for example, $\frac{1}{16}$-inch, above the upper surface of lens blank 5, thus to provide only a thin film of predetermined thickness over the lens blank. It is particularly desirable to limit the thickness of the film since thin films may be much more rapidly solidified and melted than is the case with comparatively thick films.

It will be obvious to those skilled in the art that, with respect to the temperature of water 23, any well-known form of automatic heating device may be utilized for holding the water temperature at approximately 65.5° C. or any other desired temperature. With respect to the refrigerant 17A in plunger 17, by providing a large volume of refrigerant it will only be necessary to chill the refrigerant after extended intervals of time since the film to be cooled contains an extremely small quantity of heat. With respect to the Wood's metal 22 it will only be necessary to add from coil 24 a quantity of heat sufficient to replace that extracted during each cycle of operation from the thin film which is deposited on the lens blank.

There is illustrated in Figs. 3 and 4 of the drawing an apparatus similar to that shown in Fig. 1, except that the mold comprises the thin plate 30, the lower edge 31 of which is cut to have the meridian curvature of the lens which it is desired to form. The thickness of plate 30 is exaggerated for purposes of illustration, but it is intended that plate 30 may be of the order of one-thousandth of an inch to one-sixteenth of an inch in thickness. In the case of extremely large lenses, this thickness may be increased. For successively contacting each meridian of the blank 5, it is provided that plunger 17 may be rotated by providing an annual flange 32 which bears on supporting structure 33 connected to piston 10. The plunger may be rotated manually or by automatic means connected to shaft 15.

The process of dissolving the lens blank 5 is basically identical in principle with that described in connection with the preferred embodiment of this invention illustrated in Fig. 1. However, the purpose of this modification of the invention is to form molds such as mold 18 illustrated in Fig. 1. Blank 5 is successively covered with a film of Wood's metal and exposed to the action of water, as described hereinbefore. Each time that plunger 17 is lowered, mold 30, in effect, cuts by dissolution the lens blank 5 along one meridian thereof to thereby remove a small portion of the material of the blank. By rotating plunger 17 after each contact or after a number of contacts with the blank 5, material may be removed from the blank along successive meridians thereof. The dissolution cycles are repeated until the blank 5 is cut to the desired curvature. The blank is then coated by any suitable material which is insoluble, such for example, as varnish, and may then be used as a mold such as 18 in Fig. 1.

Another modification of this invention is illustrated in Fig. 5. There is provided a container 35 in which is enclosed a quantity of water 36. At the top of container 35 there is provided a spider 38 for fixedly supporting a mold 40. A lens blank container 3 is disposed below the mold for holding a lens blank 5. For moving container 3, there is provided a movable member 41 which is adapted to be operated by a mechanical linkage consisting of lever 42 which is pivoted at 43 together with rod 44 and drive wheel 45. The drive wheel may be rotated by a suitable motor (not shown) through shaft 46.

Since the lens blank 5 is dissolved a certain amount during each operating cycle, there is provided a flexible linkage which is connected between member 41 and lever 42 whereby the lens blank 5 may always be brought into contact with mold 40. The mechanical linkage consists of a plunger 47 which is anchored in rod member 48. Plunger 47 extends into a cut-away portion 49 in member 41 and is provided with a head 50 which bears against the walls of cut-away portion 49. There is provided a spring 51 which acts to provide lost motion between member 41 and member 48. The members 41 and 48 together with the flexible linkage are so dimensioned that lens blank 5 always contacts mold 40 regardless of the amount of material which is removed from the lens blank. There is also provided a stop member 52 on rod 41 for limiting the depth to which lens blank 5 may be dissolved.

As in the other embodiments of this invention which were described heretofore, there is provided a layer 53 of protective film-forming material on the lens blank 5. This layer may consist of Wood's metal or any suitable wax such, for example, as the following:

| Natural Waxes: | Approximate melting point range, °C. |
| --- | --- |
| Carnauba wax | 85 |
| Beeswax | 63 |
| Montan wax | 80–96 |
| Candelilla wax | 67–71 |
| Synthetic wax: | |
| Ceresin (saturated hydrocarbons) | 74–80 |
| Opalwax (castor oil hydrogenation) | 86–88 |
| Acrawax | |

For melting and solidifying the protective film-forming material, there are provided hot and cold air conduits 54 and 55, respectively. These conduits are connected through valves 58 and 59 to sources of hot and cold air 60 and 61. The flow of hot and cold air through the conduits is controlled by valves 58 and 59 which are disposed adjacent the cam portion 63 of wheel 45. This cam is dimensioned to open valves 58 and 59 at the proper times and for the proper time intervals to melt the protective film and subsequently cool it to solidify it while mold 40 is in contact therewith.

For forming a lens by dissolution, the lens blank 5 is moved upwardly and downwardly by means of movable member 41, lever 42, rod 44, wheel 45 and shaft 46. As the container moves upwardly, cam 63 opens valve 58 so that the protective film of wax 53 is subjected to a blast of hot air from conduit 54, whereby any water which is present on the layer 53 or on the surface of the crystal is vaporized and removed and the film 53 is heated to the melting temperature. To do this, the air temperature should be sufficiently high to melt the wax. In its liquid state, the wax film 53 spreads evenly over the upper surface of blank 5 and as the container moves further in an upward direction, cam 63 operates valve 59 whereby the wax is subjected to a blast of cold air from conduit 55. At this time, the mold 40 contacts the wax and portions of the upper surface of blank 5 removing the wax from the portions contacted. While the container is in this uppermost position, the wax is cooled to such a temperature that it solidifies to a certain degree, such that it holds the form imparted thereto by mold 40. Certain portions of lens blank 5 which are contacted by the mold are exposed after contact with mold 40. Continued rotation of wheel 45 causes the container to be lowered into water 36, whereby the exposed portions of blank 5 are subjected to the dissolution action of the water and a minute quantity of the lens blank is dissolved from the exposed portions thereof. As the container 3 subsequently rises again, valve 58 is opened and hot air from conduit 54 removes the water from the surface of blank 5 and liquifies the wax layer 53, thereby redistributing it over the surface of the blank and completing a cycle of operation. This cycle is repeated until lens blank 5 has the desired curvature.

The dissolution process is terminated automatically by the stop member 52 on the member 41. The position of this member is adjusted to insure that mold 40 will eventually contact and form a complete lens surface on lens blank 5. The stop engages the spider 38 when sufficient material has been dissolved to form a complete lens surface, thereby automatically to prevent further dissolution.

The flexible connection between member 41 and member 48 provides lost motion. The parts of this connetcion are so dimensioned that the lens blank engages the lower surface of mold 40 prior to the time that member 41 arrives at the upper extremity of its motion. During the remainder of its upward motion, spring 51 absorbs this motion. Thus lens blank 5 engages mold 40 regardless of the amount of material dissolved therefrom and in addition the lens blank remains in engagement with mold 40 for a certain period of time which may be adjusted by adjusting the lost motion in the flexible connection. This interval between the upward and downward motion of the lens blank is of particular advantage since it allows a cooling period in which the wax layer on the surface of the lens blank may become solidified.

The apparatus illustrated in Fig. 5 may be utilized in conjunction with other protective films than wax. For example, Wood's metal may be deposited on the lens surface to a thickness of the order of $\frac{1}{16}$ of an inch. By providing hot and cold air blasts of the proper temperature, the Wood's metal may be melted and solidified in the same manner as described hereinbefore in connection with wax.

Still further materials which may be utilized in the apparatus shown in Fig. 5 are amalgams such, for example, as the composition consisting of mercury and silver. In utilizing an amalgam as a protective film, the initial step may be to form a film of mercury over the surface of the lens blank. As the lens blank is moved into contact with the mold, silver may be added to form an amalgam which will retain the form of the mold. After the lens blank is immersed in water and removed therefrom, as described hereinbefore, more mercury may be added whereby to liquify the protective film and prepare it for subsequent contact by the mold. The apparatus of Fig. 5 may be utilized in connection with an amalgam film by manually adding mercury and silver to the film for obtaining the effects described above. The operation may be made automatic by providing automatic apparatus for feeding silver and mercury to the surface of the lens blank in timed relation to immersion of the lens blank.

In Fig. 6 of the drawings, there is illustrated a modified form of mold 70 having a projection 71 which is intended to represent the negative of, for example, a 90° sector only of the lens which it is desired to form by dissolution. It is particularly desirable to use this form of mold for forming large lenses, such as those utilized in astronomical telescopes. Mold 70 may be substituted for mold 30 in Fig. 3 and successively moved into contact with the lens blank 5 to form a sector only of the lens. After a first sector is formed, the mold may be rotated to form another sector adjacent to the first one. By successively rotating the plunger 17 to form successive sectors, a complete lens is eventually formed to have the desired curvature. This type of mold is particularly advantageous where it is desired to form a lens having both concave and convex parts. In this type of lens there are elevated islands of material left on the lens blank and these have a tendency to break loose. However, it is found that by forming the lens alternately in sectors this tendency is removed.

This same form of mold may be used where it is desired to manufacture a large lens in completely separate sectors or pieces. Each sector or piece of the lens may be inserted in container 3 and formed by the dissolution process described in connection with Figs. 1, 3 and 5. After all of the sectors have been formed, they may then be assembled in juxtaposition and jointed by a suitable adhesive material. This method is particularly adapted to the formation of large lenses since in the case of large glass lenses exceedingly long periods of time are required to complete the casting and grinding processes. Furthermore, the casting process requires extreme care in control of temperatures and extremely expensive casting and cooling apparatus. When the lens is formed of a soluble material and formed a sector at a time, there is no danger of injury and the period of formation is very short compared to that required for forming glass lenses. Also, it is to be noted that lenses formed by the process described herein are accurate in every respect because they are controllably dissolved to have substantially the exact form of the mold which is used in the dissolution process.

This invention is not limited to the specific forms of apparatus or the specific methods for controlling dissolution of soluble lens materials. For example, the dissolution of lens materials may be controlled by moving a mold into contact with the lens blank or by moving the lens blank into contact with the mold. Also, it is not necessary that the specific heating and cooling apparatus illustrated herein be used for heating and cooling the film-forming material or the mold.

With respect to the materials which may be utilized as lens materials, it is to be noted that any material which has the proper optical characteristic may be utilized in accordance with the method and apparatus contemplated by this invention. For example, any crystalline material of the cubic system is suitable for a lens material and such materials are, among others, sodium chloride, lithium chloride, potassium bromide or ammonium alum (otherwise known as alum ammonium sulphate). Water in any physical form or temperature as well as other secondary polar solvents may be used for controlled dissolution of crystalline materials.

The apparatus illustrated herein may be further modified, for example, by providing external sources of water or solvents and external sources of film-forming materials. Suitable pumping apparatus may be provided in connection with such sources for introducing the solvents or the film-forming materials into contact with the lens material at the proper times during the lens dissolution process.

From the foregoing description, it is evident that extremely high quality lenses may be manufactured for use in optical apparatus such as cameras and telescopes. If the lens material consists of a salt crystal, the effects of ambient atmospheric conditions may be nullified by coating the crystal with a transparent insoluble material such as varnish or lacqued. Thus, there is provided a method and apparatus for manufacturing high quality optical lenses at such reduced cost that even the simplest and cheapest cameras and telescopes may be equipped with high quality optical systems.

This invention is particularly advantageous in that it is now possible economically to manufacture lenses having complex curvatures. Whereas, by known mechanical methods it is impossible accurately and economically to grind a lens to a complex curvature, it is now possible to, in effect, grind lenses having any curvature which may be desirable or necessary in a given optical system. For example, in a television camera or receiver which employs what is known as a Schmidt optical system, it is necessary to provide a corrective plate having complex curvature for correcting the effects of spherical aberration caused by the spherical mirror which is an essential element of the Schmidt optical system. Having a method and apparatus for economically manufacturing lenses of complex curvature, it will be an extremely simple matter to provide all television cameras and receivers with Schmidt optical systems whereby greatly to improve the sensitivity of television cameras and the light-projecting qualities of television receivers.

While there has been described what is, at present, considered the preferred embodiment of the invention, it will be obvious to those skilled in the art that various changes and modifications may be made therein without departing from the invention, and therefore it is aimed in the appended claims to cover all such changes and modifications as fall within the true spirit and scope of the invention.

What is claimed is:

1. Apparatus for controlling dissolution of a soluble lens blank to shape the lens to a desired contour, comprising a mold having a shape complementary to said desired contour, means for supporting a soluble lens blank in axial alignment with said mold, means for coating said lens blank with a material non-soluble in the solvent for said lens blank but subject to displacement under pressure of said mold to remove portions thereof from said lens blank, a container containing a lens solvent material disposed about said means for supporting said lens blank, drive means for producing a reciprocating relative movement between said mold and said lens blank support along said axis to alternately produce pressure between said mold and said lens blank, to remove the coating from portions of said blank, and to immerse said blank in said solvent, and means to redistribute said coating over said blank intermediate immersion of said blank and the next successive movement into contact with said mold.

2. Apparatus according to claim 1, wherein said coating material is subject to liquification upon heating and solidification upon cooling, wherein said means for redistributing said material includes means for heating said material to liquification whereby it will spread over said blank, further comprising means for cooling said coating after movement into contact with said mold.

3. Apparatus according to claim 2, wherein said last named means comprises means for maintaining said mold cooled.

4. Apparatus according to claim 3, wherein said container comprises an enclosing side wall, and a longitudinally movable bottom end wall portion, said means for supporting said lens blank comprises an open supporting structure fastened to said side wall intermediate the ends thereof and said drive means includes rigid supporting rods fastened to said movable wall supporting said mold, and a drive mechanism for reciprocating said end wall, said means for redistributing said coating comprising a quantity of coating material in said container on said movable end wall to a depth to cover said lens blank support upon the upward movement of said end wall and to uncover completely said support at the lower extremity of movement of said end wall, said solvent filling said container above said coating material and extending above said lens blank support.

5. Apparatus according to claim 4, wherein said mold has the desired complementary contour along a narrow meridian zone of said lens blank, further comprising means for rotating said mold about its axis intermediate successive reciprocations of said mold.

6. A method of shaping a soluble lens blank into a desired contour by the use of a mold having a shape complementary to said contours and a lens solvent material, comprising coating said lens blank with a material non-soluble in the solvent for said lens, but subject to displacement under pressure of said mold against said blank, repeatedly reciprocating said mold and said blank into contact to remove the coating from areas of contact of said blank and said mold, immersing said blank in a lens blank solvent after each contact with said mold, and redistributing said coating on said lens between successive immersions of said blank.

7. A method according to claim 6, wherein said coating material is subject to liquification upon heating and solidification upon cooling, further comprising heating said coating during said redistribution, and cooling said coating after movement into contact with said mold.

FRANÇOIS CHARLES
PIERRE HENROTEAU.

REFERENCES CITED

The following references are of record in the file of this patent:

UNITED STATES PATENTS

| Number | Name | Date |
|---|---|---|
| 2,372,535 | Walker | Mar. 27, 1945 |
| 2,384,638 | Penberthy | Sept. 11, 1945 |